(12) United States Patent
Rao et al.

(10) Patent No.: US 7,991,153 B1
(45) Date of Patent: Aug. 2, 2011

(54) GLYPH ENCRYPTION SYSTEM AND RELATED METHODS

(75) Inventors: John Rao, Tempe, AZ (US); Jeffrey Bernstein, San Diego, CA (US)

(73) Assignee: Nanoglyph, LLC, Tempe, AZ (US)

( * ) Notice: Subject to any disclaimer, the term of this patent is extended or adjusted under 35 U.S.C. 154(b) by 513 days.

(21) Appl. No.: 12/198,768

(22) Filed: Aug. 26, 2008

(51) Int. Cl.
*H04K 1/00* (2006.01)

(52) U.S. Cl. .............................. 380/28; 380/44; 713/176

(58) Field of Classification Search .................... 380/28, 380/37, 42, 44, 255, 287; 713/150, 189, 713/193; 726/2
See application file for complete search history.

(56) References Cited

U.S. PATENT DOCUMENTS

| | | |
|---|---|---|
| 4,728,984 A | 3/1988 | Daniele |
| 4,786,940 A | 11/1988 | Daniele |
| 5,065,437 A | 11/1991 | Bloomberg |
| 5,091,966 A | 2/1992 | Bloomberg et al. |
| 5,128,525 A | 7/1992 | Stearns et al. |
| 5,129,014 A | 7/1992 | Bloomberg |
| 5,131,049 A | 7/1992 | Bloomberg et al. |
| 5,168,147 A | 12/1992 | Bloomberg |
| 5,187,753 A | 2/1993 | Bloomberg et al. |
| 5,221,833 A | 6/1993 | Hecht |
| 5,245,165 A | 9/1993 | Zhang |
| 5,315,098 A | 5/1994 | Tow |
| 5,321,773 A | 6/1994 | Kopec et al. |
| 5,355,420 A | 10/1994 | Bloomberg et al. |
| 5,444,779 A | 8/1995 | Daniele |
| 5,449,895 A | 9/1995 | Hecht et al. |
| 5,449,896 A | 9/1995 | Hecht et al. |
| 5,453,605 A | 9/1995 | Hecht et al. |
| 5,486,686 A | 1/1996 | Zdybel, Jr. et al. |
| 5,521,372 A | 5/1996 | Hecht et al. |
| 5,526,444 A | 6/1996 | Kopec et al. |
| 5,572,010 A | 11/1996 | Petrie |
| 5,572,601 A | 11/1996 | Bloomberg |
| 5,576,532 A | 11/1996 | Hecht |
| 5,611,575 A | 3/1997 | Petrie |
| 5,694,102 A | 12/1997 | Hecht |
| 5,717,197 A | 2/1998 | Petrie |
| 5,761,686 A | 6/1998 | Bloomberg |
| 5,765,176 A | 6/1998 | Bloomberg |
| 5,771,245 A | 6/1998 | Zhang |
| 5,825,933 A | 10/1998 | Hecht |
| 5,842,191 A | 11/1998 | Stearns |
| 5,862,255 A | 1/1999 | Davies et al. |
| 5,862,271 A | 1/1999 | Petrie |
| 5,864,127 A | 1/1999 | Jackson et al. |
| 5,870,510 A | 2/1999 | Hecht |
| 5,883,986 A | 3/1999 | Kopec et al. |
| 5,901,224 A | 5/1999 | Hecht |
| 5,917,464 A | 6/1999 | Stearns |
| 5,929,429 A | 7/1999 | Petrie |
| 5,937,110 A | 8/1999 | Petrie et al. |
| 5,939,703 A | 8/1999 | Hecht et al. |
| 5,949,055 A | 9/1999 | Fleet et al. |

(Continued)

*Primary Examiner* — Joe H Cheng
(74) *Attorney, Agent, or Firm* — Booth Udall, PLC (57) ABSTRACT

Systems and method of encrypting text using glyphs. Implementations of a first method may include receiving text including one or more characters having an order, altering the order of the one or more characters using a mixer cipher to produce one or more mixed characters, and substituting for the one or more mixed characters one or more encrypted characters using a stochastic cipher. The method may further include generating at least one glyph by associating one or more symbols and a position of the one or more symbols within a perimeter of the at least one glyph with the one or more encrypted characters and writing the at least one glyph to a substrate.

17 Claims, 7 Drawing Sheets

U.S. PATENT DOCUMENTS

| | | | |
|---|---|---|---|
| 5,974,150 A * | 10/1999 | Kaish et al. | 713/179 |
| 6,000,613 A | 12/1999 | Hecht et al. | |
| 6,000,621 A | 12/1999 | Hecht et al. | |
| 6,076,738 A | 6/2000 | Bloomberg et al. | |
| 6,182,901 B1 | 2/2001 | Hecht et al. | |
| 6,208,771 B1 | 3/2001 | Jared et al. | |
| 6,296,192 B1 | 10/2001 | Hecht | |
| 6,310,988 B1 | 10/2001 | Flores et al. | |
| 6,327,395 B1 | 12/2001 | Hecht et al. | |
| 6,340,118 B1 | 1/2002 | Hecht | |
| 6,360,951 B1 | 3/2002 | Swinehart | |
| 6,427,920 B1 | 8/2002 | Bloomberg et al. | |
| 6,439,465 B1 | 8/2002 | Bloomberg | |
| 6,594,406 B1 | 7/2003 | Hecht | |
| 6,641,051 B1 | 11/2003 | Illowsky et al. | |
| 6,641,053 B1 | 11/2003 | Breidenbach et al. | |
| 6,678,415 B1 | 1/2004 | Popat et al. | |
| 6,678,425 B1 | 1/2004 | Flores et al. | |
| 6,714,677 B1 | 3/2004 | Stearns et al. | |
| 6,738,518 B1 | 5/2004 | Minka et al. | |
| 6,783,069 B1 | 8/2004 | Hecht et al. | |
| 6,823,075 B2 * | 11/2004 | Perry | 382/100 |
| 6,880,755 B2 | 4/2005 | Gorbet et al. | |
| RE38,758 E | 7/2005 | Bloomberg et al. | |
| 6,931,129 B1 * | 8/2005 | Faber et al. | 380/210 |
| 6,935,562 B2 | 8/2005 | Hecht et al. | |
| 6,970,259 B1 | 11/2005 | Lunt et al. | |
| 6,993,655 B1 | 1/2006 | Hecht et al. | |
| 7,079,667 B2 | 7/2006 | Hecht et al. | |
| 7,080,041 B2 * | 7/2006 | Nagel | 705/51 |
| 7,089,420 B1 * | 8/2006 | Durst et al. | 713/176 |
| 7,127,615 B2 * | 10/2006 | Moskowitz | 713/176 |
| 7,246,958 B2 | 7/2007 | Saund et al. | |
| 7,350,140 B2 | 3/2008 | Tanaka et al. | |
| 7,577,844 B2 * | 8/2009 | Kirovski | 713/180 |
| 7,813,503 B2 * | 10/2010 | Campagna et al. | 380/44 |
| 2003/0051026 A1 * | 3/2003 | Carter et al. | 709/224 |
| 2004/0143403 A1 * | 7/2004 | Brandon et al. | 702/19 |
| 2006/0265649 A1 * | 11/2006 | Danilo | 715/542 |
| 2008/0046039 A1 * | 2/2008 | Corndorf | 607/60 |
| 2008/0110995 A1 | 5/2008 | IfTime et al. | |
| 2008/0301431 A1 * | 12/2008 | Hea | 713/150 |

* cited by examiner

GLYPH ENCRYPTION SYSTEM AND RELATED METHODS

BACKGROUND

1. Technical Field

Aspects of this document relate generally to systems and methods for encrypting human readable symbols.

2. Background Art

Glyphs have been used in conventional systems for relaying of messages in machine-readable form. An example of a conventional glyph encoding system is Xerox Corporation's DataGlyph® document technology. The DataGlyph® technology encodes information in machine-readable patterns of slashes and includes a wide variety of error-correcting and recovery processes if portions of the glyphs are missing or distorted. The information in the messages encoded in glyph form are retrieved after processing of binary images of the glyphs are received using a reader device.

SUMMARY

Implementations of a system for using glyphs to encrypt text may include a text input module configured to receive text having one or more characters and a mixer cipher module coupled with the text input module and configured to alter an arrangement of the one or more characters using a mixer cipher to produce one or more mixed characters by sequentially translating a position of the one or more characters one or more times. A stochastic cipher module coupled with the mixer cipher module may also be included and may also contain an expected value module. The stochastic cipher module may be configured to generate one or more encrypted characters by sending a character parameter and a text position parameter corresponding with the one or more mixed characters to the expected value module. The expected value module may be configured to generate a value of an expected value function using the character parameter and the text position parameter and associate the value of the expected value function using an expected value table with one or more alphanumeric characters corresponding with the one or more encrypted characters. The system may also include a glyph generation module coupled with the stochastic cipher module and configured to generate at least one glyph by associating one or more symbols and a position of the one or more symbols within a perimeter of the at least one glyph with the one or more alphanumeric characters corresponding with the one or more encrypted characters using a symbol structure database and a glyph writing module coupled with the glyph selection module and configured to write the at least one glyph to a substrate.

Implementations of glyph encryption systems may include one, all, or any of the following:

A glyph reading module configured to read the one or more glyphs from the substrate.

A glyph correlation module may be coupled with the glyph reading module and may be configured to generate the one or more encrypted characters by correlating the one or more symbols and the position of the one or more symbols within the perimeter of the at least one glyph with the one or more with the alphanumeric characters corresponding with the one or more encrypted characters using the symbol structure database.

A reverse stochastic cipher module may be coupled with the glyph correlation module and may include a reverse expected value module. The reverse stochastic cipher module may be configured to substitute for the one or more encrypted characters one or more mixed characters using a reverse stochastic cipher by correlating the alphanumeric characters corresponding with the one or more encrypted characters with the character parameter and the text position parameter corresponding with the one or more mixed characters using the expected value table including in the reverse expected value module.

A mixed character generation module may be coupled with the reverse stochastic cipher module and may be configured to generate the one or more mixed characters using a stochastic parameter table configured to correlate the output character parameter and the text position parameter with the corresponding one or more mixed characters.

A text generation module may be coupled with the mixed character generation module and may be configured to form the text including one or more characters by altering an arrangement of the one or more mixed characters using a reverse mixer cipher configured to reorder the one or more mixed characters by sequentially translating the position of the one or more mixed characters one or more times.

The symbol structure database may further include where each of the one or more symbols and the position of the one or more symbols within the perimeter of the at least one glyph are uniquely correlated with an alphanumeric character through the symbol structure database and wherein the perimeter of the at least one glyph comprises a cross.

The expected value function may be:

$$E[x^a(1-x)^b] = \sum_0^1 x^a(1-x)^b P(x) dx$$

where a is the character parameter, b is the text position parameter and P(x) is a probability density function for x.

Implementations of glyph encryption systems may utilize implementations of a first method of using glyphs to encrypt text. The method may include receiving text including one or more characters having an order, altering the order of the one or more characters using a mixer cipher to produce one or more mixed characters, and substituting for the one or more mixed characters one or more encrypted characters using a stochastic cipher. The method may further include generating at least one glyph by associating one or more symbols and a position of the one or more symbols within a perimeter of the at least one glyph with the one or more encrypted characters and writing the at least one glyph to a substrate.

Implementations of a first method of using glyphs to encrypt text may include one, all, or some of the following:

Implementations of a first method may further include reading the one or more glyphs from the substrate, generating the one or more encrypted characters by correlating the one or more symbols and the position of the one or more symbols within the perimeter of the at least one glyph with the one or more encrypted characters, substituting for the one or more encrypted characters one or more mixed characters using a reverse stochastic cipher, and forming the text including one or more characters by altering an order of the one or more mixed characters using a reverse mixer cipher.

Altering the order of the one or more characters using the mixer cipher may further include sequentially exchanging the position of each of the one or more characters one or more times.

Substituting for the one or more mixed characters may further include generating the one or more encrypted characters by corresponding a character parameter and a position parameter with the one or more mixed characters using a stochastic parameter table, and associating the calculated value of the expected value function with one or more encrypted characters using an expected value table.

The method may further include calculating a value of an expected value function using the character parameter and the position parameter.

Generating at least one glyph by associating one or more symbols and the position of the one or more symbols within the perimeter of the at least one glyph may further include selecting the one or more symbols and the position of the one or more symbols using a symbol structure database.

Each of the one or more symbols and its position may be uniquely correlated with an alphanumeric character through the symbol structure database.

Implementations of a glyph encryption system may utilize implementations of a second method of using glyphs to encrypt text. The method may include receiving text having one or more characters and altering an arrangement of the one or more characters using a mixer cipher to produce one or more mixed characters by sequentially translating a position of the one or more characters one or more times. The method may further include generating one or more encrypted characters using a stochastic cipher by inputting a character parameter and a text position parameter corresponding with each of the one or more mixed characters into an expected value function and associating an output of the expected value function with one or more alphanumeric characters corresponding with the one or more encrypted characters with an expected value table. The method may also include generating at least one glyph by associating one or more symbols and a position of the one or more symbols within a perimeter of the at least one glyph with the one or more encrypted characters using a symbol structure database and writing the at least one glyph to a substrate.

Implementations of a second method of using glyphs to encrypt text may include one, all, or some of the following:

Implementations of the second method may further include reading the one or more glyphs from the substrate and generating the one or more encrypted characters by correlating the one or more symbols and the position of the one or more symbols within the perimeter of the at least one glyph with the one or more encrypted characters. The method may further include substituting for the one or more encrypted characters one or more mixed characters using a reverse stochastic cipher having a reverse expected value function configured to output the character parameter and the text position parameter corresponding with the one or more mixed characters using the alphanumeric character corresponding with the one or more encrypted characters using the one or more alphanumeric characters corresponding with the one or more encrypted characters and the expected value table. The method may further include generating the one or more mixed characters using a stochastic parameter table configured to correlate the output character parameter and the text position parameter with each of the corresponding one or more mixed characters. The method may also include forming the text having one or more characters by altering an arrangement of the one or more mixed characters using a reverse mixer cipher configured to reorder the one or more mixed characters by sequentially translating the position of the one or more mixed characters one or more times.

Generating the one or more encrypted characters using the stochastic cipher may further include selecting a probability density function for the expected value function.

Associating an output of the expected value function with an alphanumeric character corresponding with the one or more encrypted characters may further include corresponding a character parameter and a position parameter with the one or more mixed characters using a stochastic parameter table, calculating a value of the expected value function using the character parameter and the position parameter and associating the calculated value of the expected value function with one or more alphanumeric characters corresponding with one or more encrypted characters using the expected value table.

The symbol structure database may further include where each of the one or more symbols and the position of the one or more symbols within the perimeter of the at least one glyph are uniquely correlated with an alphanumeric character through the symbol structure database.

Implementations of first and second methods of encrypting text using glyphs may include one, all, or some of the following:

The expected value function may be:

$$E[x^a(1-x)^b] = \sum_0^1 x^a(1-x)^b P(x)dx$$

where a is the character parameter, b is the text position parameter and P(x) is the probability density function for x.

The perimeter of the at least one glyph may include a cross.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended glyph encryption system and/or assembly procedures for a glyph encryption system will become apparent for use with particular implementations from this disclosure. Accordingly, for example, although particular implementations are disclosed, such implementations and implementing components may comprise any configuration, capacity, functionality, shape, size, style, type, model, version, measurement, concentration, material, quantity, and/or the like as is known in the art for such glyph encryption systems and implementing components, consistent with the intended operation.

Figure 1A:
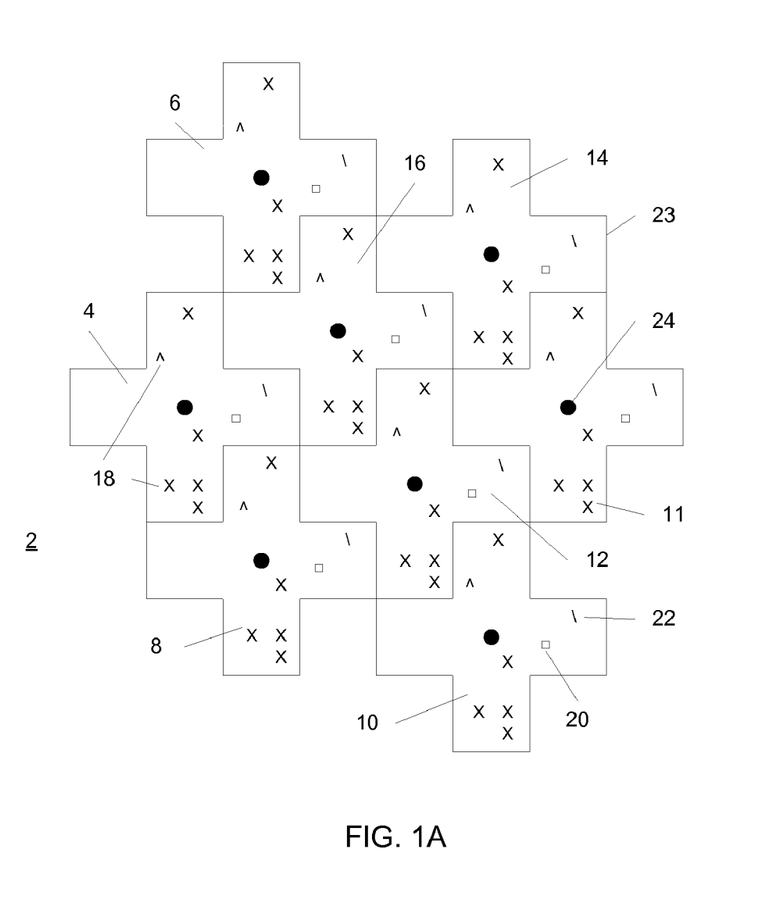
FIG. 1A is a detail view of a plurality of glyphs on a substrate.

Referring to FIG. 1A, a section of a substrate 2 with various implementations of glyphs 4, 6, 8, 10, 12, 14, 16 is illustrated. As illustrated, the glyphs generally are in the shape of a cross and include one or more symbols 18, 20, 22 and a center dot 24. The center dot 24 may be used by various implementations of glyph reading systems and methods as an aid in finding the center of the glyph and may or may not be present in particular glyph implementations. As illustrated, the one or more symbols 18, 20, 22 includes typeface symbols, including alphanumeric, special characters, and other ASCII characters. In other particular implementations, however, any of a wide variety of symbols may be implemented, including, by non-limiting example, arcs, ellipsoids, parallelograms, marks, dots, slashes, interferometric patterns, holograms, and any other closed or open shape, mark, structure, or pattern sufficiently sized to be included within the glyph. In addition, any of the foregoing listed symbol types may be used as center dots 24, depending on the requirements of the glyph type being used. While the perimeter 23 of the glyphs 4, 6, 8, 10, 12, 14, 16 illustrated in FIG. 1A is indicated by lines, in other particular implementations, any line or group of symbols like those previously discussed may be used. In particular implementations of glyphs, no border indicators are used between one glyph and another.

Implementations of glyphs 4, 6, 8, 10, 12, 14, 16 may encode information in two ways: 1) through the type of symbol 18, 20, 22 contained within the perimeter of the glyphs and 2) through the position of the symbol 18, 20, 22 within the glyph. Because of this, each of the symbols 18, 20, 22 at a particular position within the glyph may correspond with a distinct alphanumeric value. Accordingly, even if the same symbol 18, 20, 22 is located in two places within the perimeter of a glyph, because of the difference in position of the symbols, the two symbols will encode two distinct alphanumeric values. In particular implementations, all of the alphanumeric values required to encode a particular amount of text in glyph form may be included within the perimeter of a single glyph. In these implementations, like the implementations of glyphs 4, 6, 8, 10, 12, 14, 16 illustrated in FIG. 1A, all of the glyphs on the substrate 2 will be identical copies of each other. Because multiple copies exist, if some particular copy is damaged or misprinted, another glyph can be read in its place, thus increasing the redundancy of the system. In other implementations, a glyph or combinations of glyphs may correspond to a unique alphanumeric value and the substrate 2 will include various repetitious copies of different glyph types. In such implementations, any one of the glyphs 4, 6, 8, 10, 12, 14, 16 may differ from each other through the use of different symbols, symbol positions, glyph perimeter shapes (larger and smaller cross sizes or different border shapes entirely) or through glyph ordering. If the cross sizes are varied, this may make the glyphs more difficult to counterfeit in particular implementations.

Figure 1B:
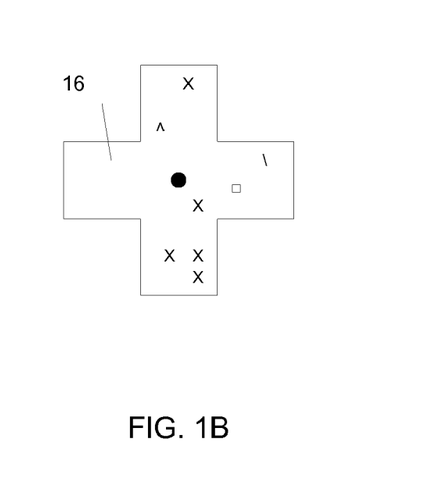
FIG. 1B is a perspective view of one of the plurality of glyphs.

Referring to FIG. 1B, an implementation of an individual glyph 16 like the glyph 16 of FIG. 1A is illustrated. As illustrated, the glyph 16 may include various symbol types and may include cross portions that both include and do not include symbols. As was previously discussed, the symbols included in each individual glyph encode a particular alphanumeric character, and all of these symbols coupled with their positions within the perimeter of the glyph may encode the text. In other particular implementations of glyphs, each glyph may contain a unique number of or arrangement of symbols. In these implementations, the glyph 16 may represent the letter "A" or the number "1." The correlation between a particular symbol and the symbol's position within the perimeter of a glyph and an alphanumeric character may be stored in computer readable form on computer readable media as part of a symbol structure database. Because the association or correlation between the symbol and its position and the corresponding alphanumeric character can be stored, the correlation can be changed as desired by a user of a glyph encryption system. In other implementations of glyphs where the glyphs differ from each other, a particular combination of one or more glyphs may be used to represent an individual alphanumeric character or group of alphanumeric characters. For example, the collection of glyphs 4, 6, 8, 10, 12, 14, 16 illustrated in FIG. 1A may all collectively be used to represent the letter "A" or the number "1."

Figure 2:
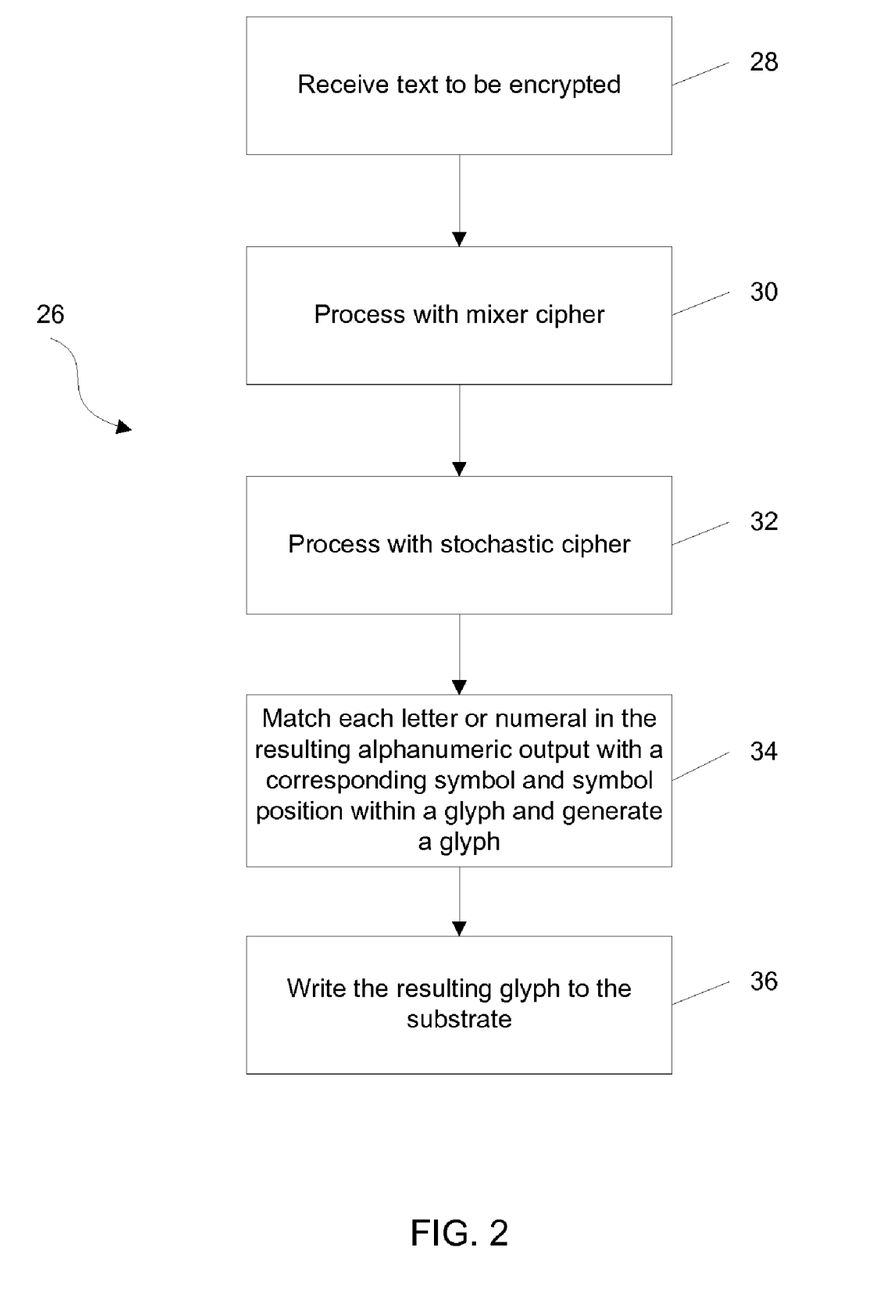
FIG. 2 is a high-level flowchart of the encryption process of an implementation of an encryption method.

Because the glyphs 4, 6, 8, 10, 12, 14, 16 have the property of association with alphanumeric characters through use of the symbol structure database, the glyphs may be used in various implementations of glyph encryption systems where alphanumeric text is first encrypted and then encoded for printing in glyph form on a substrate material. Referring to FIG. 2, a high-level flowchart of a method of encrypting text using glyphs 26 is illustrated. The method 26 illustrated in FIG. 2 includes the high-level steps of the encryption process. As illustrated, the method 26 may include the steps of receiving text to be encrypted (step 28), processing the text with a mixer cipher (step 30), processing with a stochastic cipher (step 32), matching each letter or numeral in the resulting alphanumeric output of the stochastic cipher with a corresponding symbol and symbol position within a glyph and generate a glyph (step 34), and writing the resulting glyph to a substrate (step 36). Particular implementations may then include writing additional copies of the resulting glyph on the substrate for redundancy purposes. Particular implementations of the method of encryption may be referred to a multi-level ciphering method because two separate ciphers (mixing and stochastic) are employed to do the encryption steps.

A wide variety of materials may be utilized as substrates on which glyphs can be written. By non-limiting example, paper, plastics, metals, rubbers, composites, or any other solid or semi-solid material may be used as a substrate for writing glyphs. In particular implementations, the substrates may be digestible or non-digestible microsubstrates as disclosed in U.S. patent application Ser. No. 11/213,214 to Rao entitled "Edible Coded Microsubstrate for Pharmaceuticals," filed Aug. 24, 2005, the disclosure of which is hereby incorporated entirely herein by reference.

Figure 3:
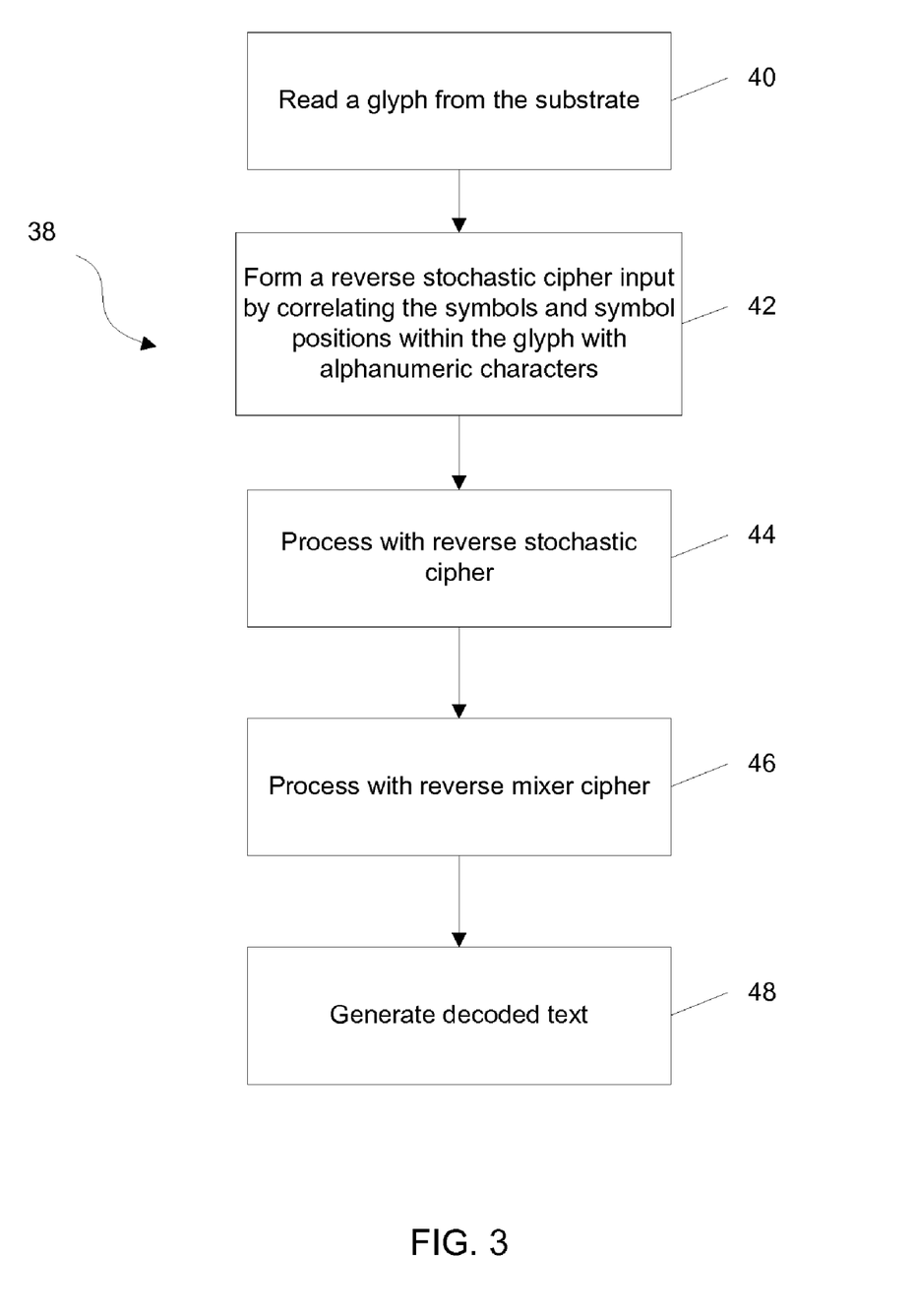
FIG. 3 a high-level flowchart of the decryption process of an implementation of a glyph encryption method.

Referring to FIG. 3, a high level flowchart of a method of decrypting text using glyphs 38 is illustrated. As illustrated, the method 38 involves the reverse of the steps of the encryption process, including reading a glyph from the substrate (step 40), forming a reverse stochastic cipher input by correlating the symbols and symbol positions within the glyph with alphanumeric characters (step 42), processing the stochastic cipher input with a reverse stochastic cipher (step 44), processing with a reverse mixer cipher (step 46), and generating decoded text (step 48), the text that was originally encrypted. Implementations of decryption methods like those illustrated in FIG. 3 may be referred to as reverse multi-level cipher processes because the reverse encryption process involves reversing of two levels of ciphers (mixing and stochastic). The method may also include reading another glyph if errors in the process are detected in case the glyph read is damages or otherwise unreadable.

Figure 4:
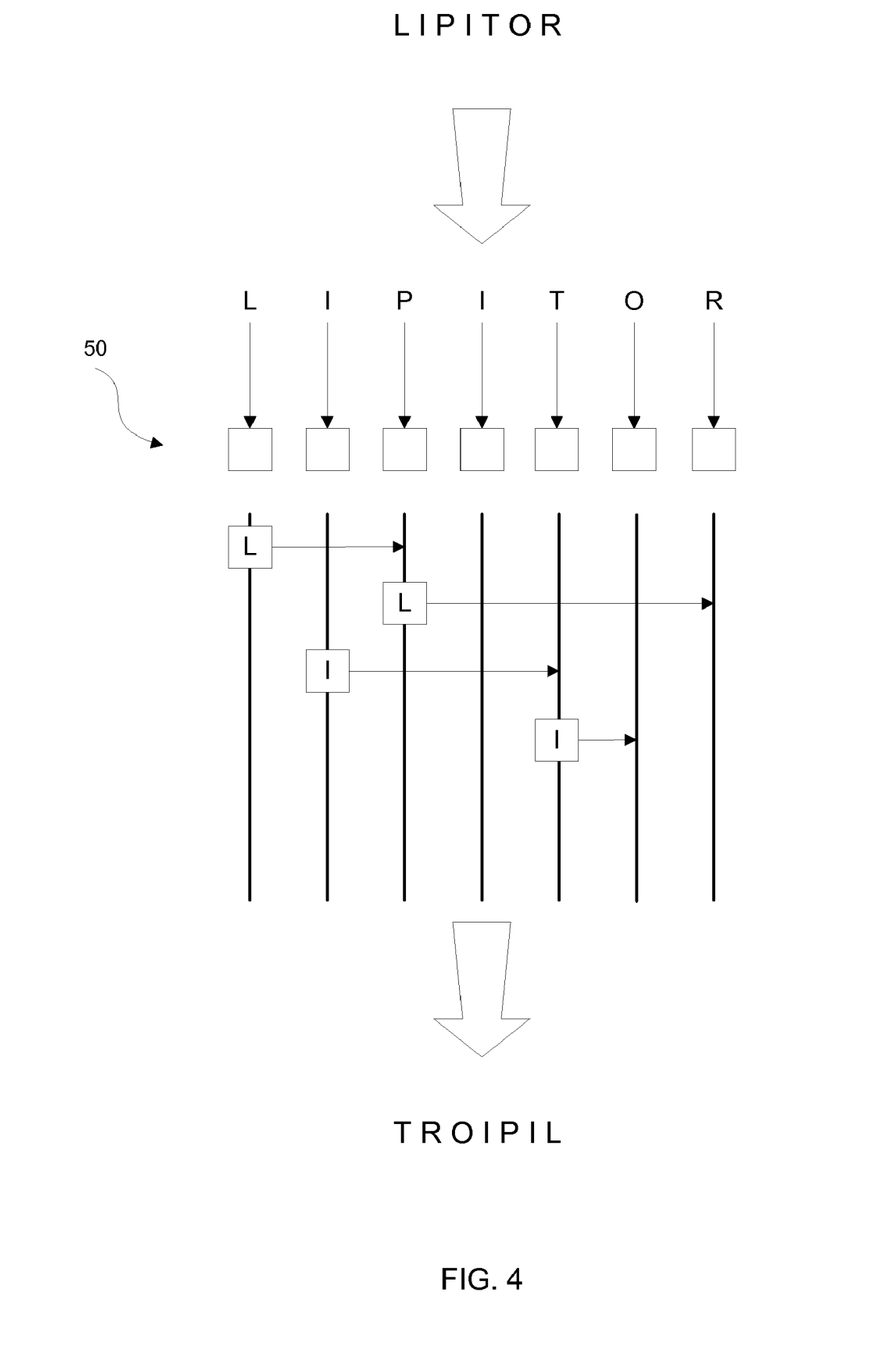
FIG. 4 is a diagram showing the operation of an implementation of a mixer cipher.

Referring to FIG. 4, a diagram of the operation of an implementation of a mixer cipher 50 is illustrated. As illustrated, the mixer cipher 50 may receive text containing one or more characters (in this case, the word LIPITOR®). The mixer cipher 50 may then take each character in text and determine its order within the text. For example, the letter I in LIPITOR is in the second character position in the order in which the text has been arranged. In other implementations of mixer ciphers, the one or more characters in the text may not be consecutively ordered from left to right, but may be arranged in any predetermined or random arrangement relative to each other or some other reference point, such as, by non-limiting example, right to left, top to bottom, alternating, and any other orientation of the one or more characters relative to each other or a reference point.

Once the mixer cipher 50 has determined the text order, the cipher 50 then alters the order of the characters by sequentially exchanging the positions of the characters. As illustrated in FIG. 4, the character L's position in LIPITOR has first been sequentially exchanged with P's position, and then with R's position. The character I's position is then exchanged with T's position and then with O's position. In the implementation of a mixer cipher 50 illustrated in FIG. 4, the cipher 50 includes exchanging character positions two times. In other particular implementations of mixer ciphers, character positions may be exchanged one or more times. While in the implementation of a mixer cipher 50 illustrated in FIG. 4 the process of sequentially exchanging positions is shown to take place two times, in this and in other implementations, the process of exchanging character positions may take place one or more times and/or for one or all of the character positions, depending upon system requirements.

Describing the operation of the mixer cipher 50 mathematically, the one or more characters in the text may be represented as a string having $X_1, X_2, X_3, \ldots X_n$ positions, where n is the length of the text string, which is equal to the number of characters. A text string with three characters ABC will have $X_1$, $X_2$, and $X_3$ positions. An implementation of a mixer cipher could then operate in the following manner: $X_1$ and $X_2$ exchange positions, followed by the sequential exchange of the new $X_1$ (originally $X_2$) with $X_3$. Following the movement of the characters, after the first exchange, the text string becomes BAC. After the second exchange it becomes CAB. The process of exchanging positions within a string implemented in software, in a computer system, in software incorporated in a computer readable medium, or in software incorporated in a computer readable medium as part of a computer system.

Once the mixer cipher has been used to sequentially exchange the positions of the characters in the text to produce one or more mixed characters, the one or more mixed characters are then processed by an implementation of a stochastic cipher. Implementations of stochastic ciphers described in this document utilize various implementations of expected value functions. However, other stochastic functions, or any other functions incorporating random behavior, could be utilized in other implementations of stochastic ciphers and glyph encryption systems. The expected value of a function is the value that it is most probable to achieve over all values of its dependent variables. The function that permits calculation of the expected value of a function is an expected value function, and can be derived for both continuous and non-continuous cases.

For example, a coin toss may be represented by the non-continuous function:

$$f(x) = \begin{cases} -1, & x = \text{heads} \\ +1, & x = \text{tails} \end{cases} \quad (1)$$

where x represents the result of an individual coin toss.

The expected value of the coin toss function (a non-continuous function) may be obtained by the following derivation:

$$E[x] = \sum_{\substack{all\ values \\ of\ x}} xP(x) \quad (2)$$

where P(x) is the probability function of the coin-toss function.

This expression simply states that the expected value of the coin toss function is the value obtained by adding up all of the individual values of x times the probability of each occurring. Because for each perfect coin toss the probability of getting a head is 0.5 and the probability of getting a tail is 0.5, (thus setting the probability function P(x) equal to 0.5), the expected value of the coin toss function after four tosses with two heads and two tails resulting may be (−1)*0.5+(−1)*0.5+(+1)*0.5+(+1)*0.5=0. As the number of tosses increases beyond just four, the expected value of the coin toss function will increasingly approach its most probable value, zero. While the foregoing result is trivial because of the nature of the coin toss function, the process followed to derive the expected value can be employed with other non-continuous functions.

For continuous functions, the expected value function can be derived from the following expression:

$$E[f(x)] = \int_{-\infty}^{+\infty} f(x)P(x)dx \quad (3)$$

Using the expressions in equations 2 and 3, an equivalent expected value function can be derived. For the exemplary purposes of this disclosure, a continuous function of the form $$f(x) = x^a(1-x)^b \quad (4)$$

may be used to generate an expected value function for use in implementations of glyph encryption systems. The corresponding expected value function is $$E[x^a(1-x)^b] = \Sigma_0^1 x^a(1-x)^b P(x) \quad (5)$$

where a is a character parameter, b is a position parameter, and P(x) is a probability distribution function associated with the continuous function.

Various implementations of the continuous function shown as equation 4 above, may employ any of a wide variety of probability distribution functions, including, by non-limiting example, a normal distribution, a Weibull distribution, a Cauchy distribution, a lognormal distribution, a Gamma distribution, and any other continuous or non-continuous distribution function type. In implementations of glyph encryption systems, expected value functions for continuous functions may be used because they may be harder to implement, replicate, or break through using reverse engineering.

In particular implementations of glyph encryption systems, the character parameter a may indicate, for example, the position of a particular letter of the alphabet in the alphabetical sequence (A would have a character parameter set equal to 1, for example). The position parameter b may indicate the position of a particular character relative to others of the one or more characters of the text. For example, in the text ABC, the position parameter for A would be set equal to 1. If values from 1 to 26 and 0 to 9 are assigned to the character parameter for the alphabetical sequence (A=1, B=2, etc) and numerical sequence, respectively, and values of the position parameter are assigned based on knowledge of the position of characters in the text being encoded, a stochastic parameter table can be formed for each character in the text to be encrypted. Such a stochastic parameter table may aid in the encryption and decryption process by allowing the corresponding character parameter and position parameter for a given text character to be determined and allowing a given text character to be determined from the values of a character parameter and position parameter.

Once a particular expected value function has been derived (any of a wide variety of two-parameter continuous functions could be used, one parameter as the character parameter a and the other as the position parameter b), the expected value function may be employed as part of an implementation of a stochastic cipher. In such implementations, the process may begin by processing the one or more mixed characters generated by the mixer cipher from the text with the stochastic cipher and first generating a character parameter and position parameter for each of the one or more mixed characters. In particular implementations, stochastic parameter tables may be used in the generation process to make the associations between the one or more mixed characters and corresponding character parameters and position parameters.

Once the set of character parameters and position parameters for each of the one or more mixed characters have been determined, the expected value function can be used in two ways to generate one or more encrypted characters or one or more alphanumeric characters corresponding with one or more encrypted characters. The first is to directly calculate the value of the expected value function given the particular character parameter and position parameter combination for each of the one or more mixed characters. With each of the values of the expected value function corresponding with the one or more mixed characters, an expected value table may be used to correlate the calculated value of the expected value function for each character parameter and position parameter combination with one or more alphanumeric characters. These one or more alphanumeric characters may be, or may be further correlated with, one or more encrypted characters. The expected value table may include all calculated values of the expected value function for all possible combinations of both character and position parameters. A sorting operation may be employed to match the calculated value of the expected value function for a given character and position parameter with the one or more alphanumeric characters.

The second way the expected value function can be used to generate one or more alphanumeric characters corresponding with one or more encrypted characters or one or more encrypted characters is to use the expected value table and the particular character parameter and position parameter for each of the one or more mixed characters directly. In such implementations, since the expected value table may be precalculated for all possible or desired combinations of character parameters and position parameters, a sorting operation may be used to match expected values with character parameters and position parameters, and then to match expected values with alphanumeric characters corresponding with one or more encrypted characters or with one or more encrypted characters. In either way in which the expected value function is used, the particular association or correlation of the expected values with the one or more alphanumeric characters or the one or more encrypted characters in implementations of expected value tables may be constructed randomly or according to a predefined pattern, and may be determined based on the particular text being encrypted.

Once the one or more alphanumeric characters corresponding with the one or more encrypted characters or the one or more encrypted characters have been generated, they may be associated with one or more symbols and symbol positions within the perimeter of a glyph through a symbol structure database. Some implementations of symbol structure databases may contain one or more symbols at particular positions within the perimeter of a glyph individually correlated with a particular alphanumeric character. In other implementations of symbol structure databases, the one or more symbols at the position within the perimeter of the glyph may be correlated with one or more alphanumeric characters or with one or more encrypted characters. Through use of the symbol structure database, a glyph may be generated and then provided to a glyph writing system. The glyph writing system then takes the glyph and writes it to a substrate. In various implementations of glyph writing systems, multiple copies of the glyph may be written adjacent to each other to enable redundancy. The glyph writing process may be accomplished through a wide variety of methods and systems, such as, by non-limiting example, laser writing, printing, lithography, stamping, atomic or molecular positioning or deposition and any other method or system useful for creating an image on a substrate.

Implementations of glyph encryption systems may be useful in applications where glyphs are used to transmit information but where the risks of counterfeiting or decryption of the message are a concern. For example, in U.S. patent application Ser. No. 11/213,214 to Rao entitled "Edible Coded Microsubstrate for Pharmaceuticals, a process for drug identification involving encoding of drug identifying information (such as the drug brand or generic name) onto edible microsubstrates is described. Because, as is described in Rao, the microsubstrates are incorporated into the named drug in a variety of ways (for example, in pill, powder, or cream form), a person such as a law enforcement officer can break a pill, find a microsubstrate, and use a reader to read the glyph-encoded information on the microsubstrate. All that is required to read an encoded but unencrypted microsubstrate is a knowledge of what alphanumeric characters each of the glyphs represent and/or how the arrangement of the glyphs communicates the drug name or what the glyph corresponding to a desired drug looks like. Accordingly, individuals such as drug counterfeiters could defeat the use of the encoded microsubstrates to prevent counterfeiting by copying or generating their own glyph-encoded microsubstrates and mixing them with imitation medication. Also drug thieves could potentially use the glyph-encoded microsubstrates to quickly determine the identity of valuable drugs by using a reader during a heist of unmarked pills in a distribution facility.

By employing a glyph encryption system that allows the pattern of glyphs on the microsubstrate to be readily altered when desired by the operator of the system, a counterfeiter's ability to merely copy or even generate a pre-existing non-encrypted glyph set becomes useless. The incredible number of potential combinations of the components of various expected value tables, stochastic parameter tables, expected value functions, or mixer ciphers employed in the glyph writing process of any particular encoded microsubstrate, may make it virtually impossible for a counterfeiter to reverse engineer or reconstruct a genuine encrypted glyph or glyph set. In addition, because the encryption parameters may be altered frequently (for example, day-to-day or batch-to-batch) even if a counterfeiter had access to the encryption system, a counterfeiter would have no way of predicting the particular parameters used for the next batch or next day's production. Many other uses and functions for glyph encryption systems are possible in many other applications beyond just drug theft/counterfeiting prevention, such as, by non-limiting example, food processing, electronics identification, software piracy, designer clothing and many other industries.

Figure 5:
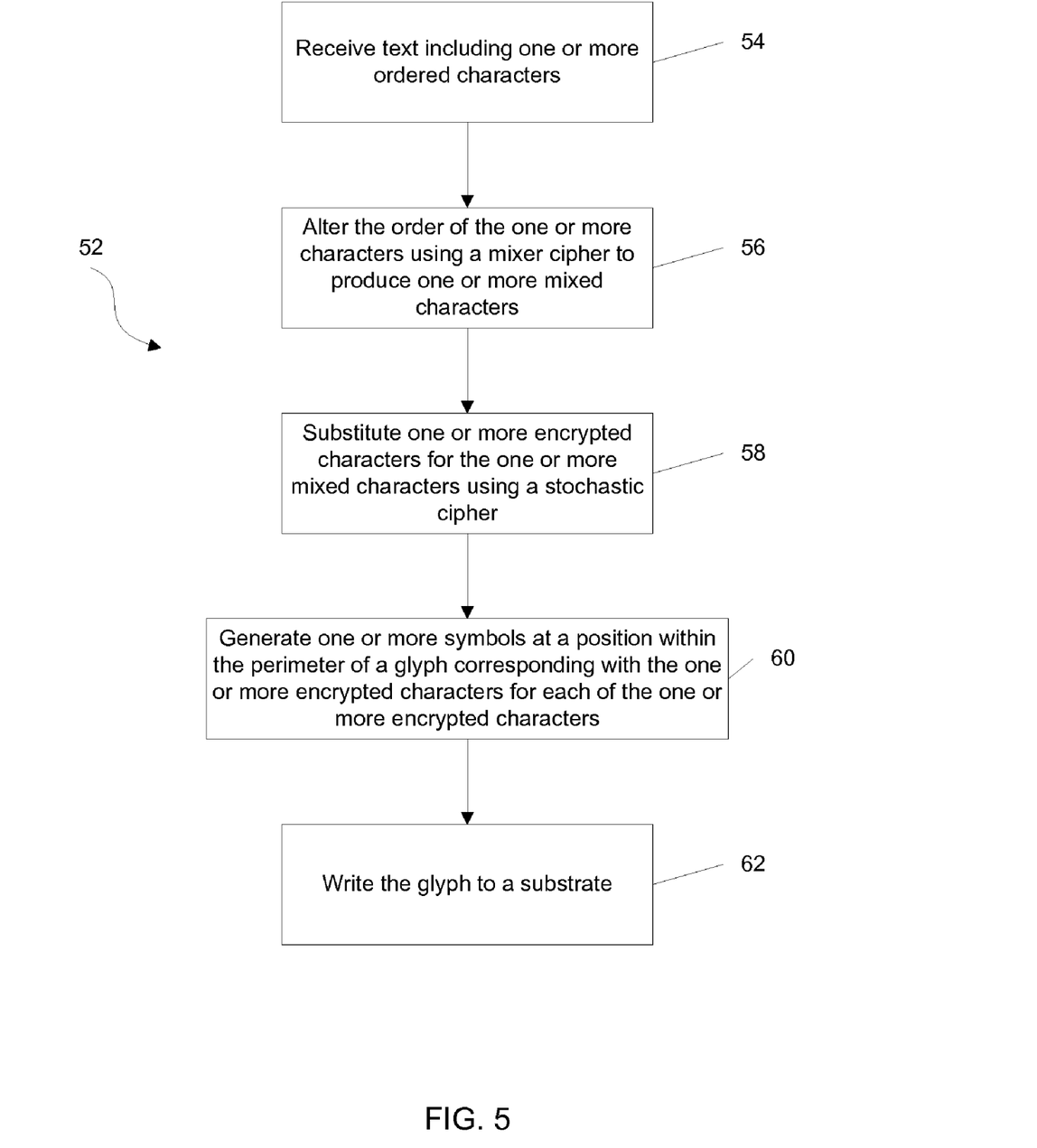
FIG. 5 is a flowchart of a first implementation of a glyph encryption method.

Referring to FIG. 5, a first implementation of a method of using glyphs to encrypt text 52 is illustrated. The method 52 may include receiving text including one or more ordered characters (step 54), altering the order of the one or more characters using a mixer cipher to produce one or more mixed characters (step 56), and substituting one or more encrypted characters for the one or more mixed characters using a stochastic cipher (step 58). The method 52 may further include generating one or more symbols at a position within the perimeter of a glyph corresponding with the one or more encrypted characters for each of the one or more encrypted characters (step 60) and writing the glyph to a substrate (step 62). Implementations of the method 52 may also employ implementations of stochastic parameter tables and expected value tables as well as various aspects of the methods discussed previously.

Figure 6:
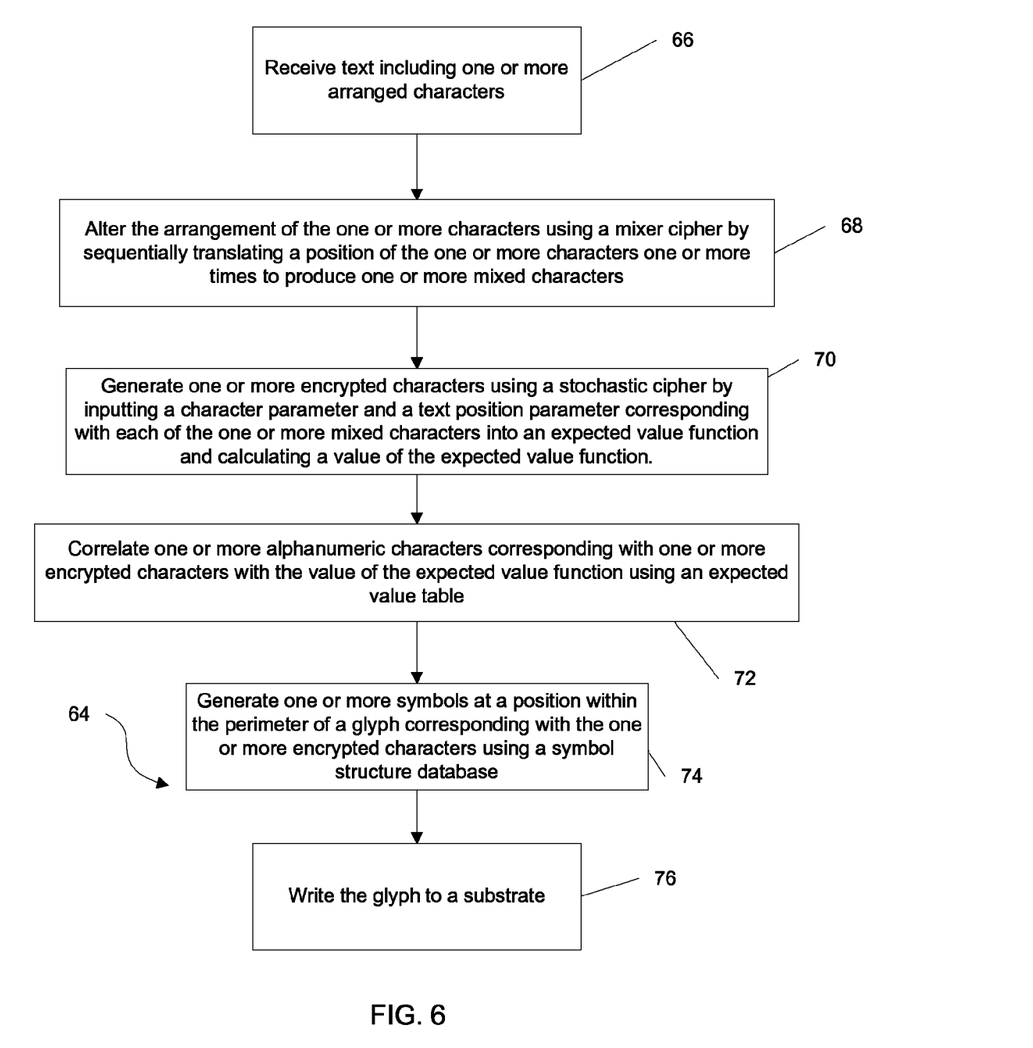
FIG. 6 is a flowchart of a second implementation of a glyph encryption method.

Referring to FIG. 6, a second implementation of a method of using glyphs to encrypt text 64 is illustrated. As illustrated, the method 64 may include receiving text including one or more arranged characters (step 66), and altering the arrangement of the one or more characters using a mixer cipher by sequentially translating a position of the one or more characters one or more times to produce one or more mixed characters (step 68). The arrangement of the text may include relationships between the characters that are not merely adjacent, left-to-right orderings, a distinction previously discussed. The method 64 may further include generating one or more encrypted characters using a stochastic cipher by inputting a character parameter and a text position parameter corresponding with each of the one or more mixed characters into an expected value function and calculating a value of the expected value function (step 70). The method 64 may also include correlating one or more alphanumeric characters corresponding with one or more encrypted characters with the value of the expected value function using an expected value table (step 72), generating one or more symbols at a position within the perimeter of a glyph corresponding with the one or more encrypted characters using a symbol structure database (step 74), and writing the at least one glyph to a substrate (step 76).

In particular implementations of the method 64, the one or more encrypted characters may be the same as the one or more alphanumeric characters corresponding with the one or more encrypted characters. In other implementations, however, the one or more encrypted characters may be distinct from the one or more alphanumeric characters and may be any character or symbol type discussed in this document, and may be associated with the one or more alphanumeric characters through an encryption table. In such implementations, an additional, third level of encryption may be available to the process through use of an encryption table to make associations between the one or more alphanumeric characters generated by the stochastic cipher and one or more encrypted characters associated through the encryption table.

Figure 7:
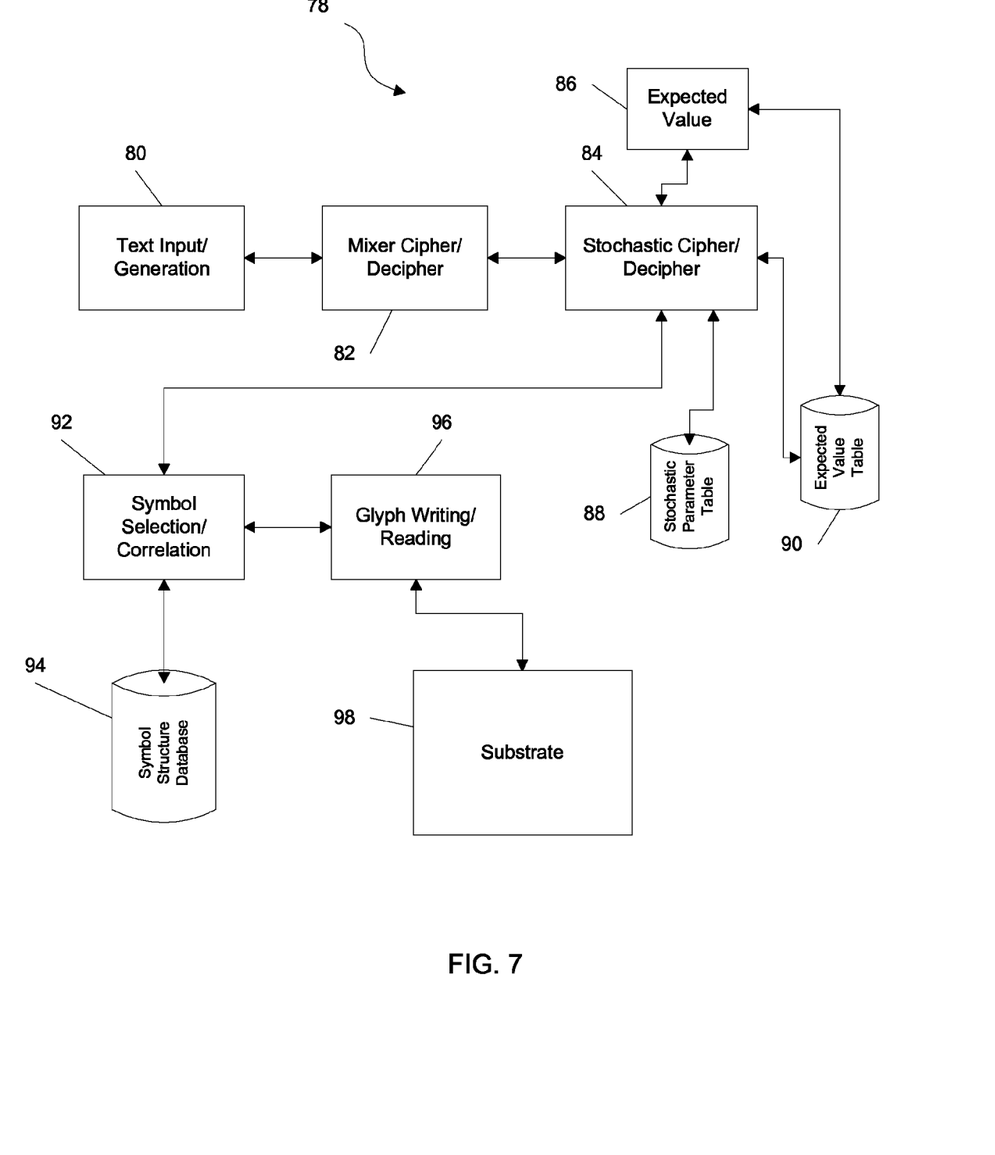
FIG. 7 is a block diagram of an implementation of a glyph encryption system.

Referring to FIG. 7, a block diagram implementation of a glyph encryption/decryption system 78 is illustrated. As illustrated, implementations of glyph encryption/decryption systems 78 may include various modules, each configured to perform an encryption operation during encryption process and also configured to perform a decryption operation during the decryption process. In other implementations of glyph encryption/decryption systems, however, any one or all of the modules may be configured to perform only an encryption or decryption operation. In some implementations of glyph encryption/decryption systems, the modules of the system may be configured only for encryption or decryption. As illustrated, a text input/generation module 80 is included as part of the system and may be configured to receive text having one or more characters during encryption as well as output text having one or more characters during decryption. The text input/generation module 80 is coupled with a mixer cipher/decipher module 82 which may be configured to utilize a mixer cipher to rearrange or reorder the position of the one or more characters of the text and produce one or more mixed characters using a mixer cipher. The mixer cipher/decipher module 82 may also be configured during decryption to receive one or more mixed characters and utilize a reverse mixer cipher to produce the one or more characters of the text.

The mixer cipher/decipher module 82 is coupled with a stochastic cipher/decipher module 84 which may be configured to receive one or more mixed characters and utilize a stochastic cipher to convert the one or more mixed characters into one or more encrypted characters. In a particular implementation of the system 78, the stochastic cipher/decipher module 84 may include an expected value module 86 that is configured to calculate a value of an expected value function using a character parameter and a position parameter received from the stochastic cipher/decipher module 84 that correspond with each of the one or more mixed characters. Implementations of the stochastic cipher/decipher module 84 may utilize a stochastic parameter table 88 to determine or correlate the character parameter and the position parameter. With the value of the expected value function, the stochastic cipher/decipher module 84 may be configured to utilize an expected value table 90 to associate one or more alphanumeric characters corresponding with one or more encrypted characters or one or more encrypted characters with the calculated value. Once the one or more alphanumeric characters corresponding with one or more encrypted characters or the one or more encrypted characters have been associated, the stochastic cipher/decipher module 84 may be configured to output the characters for further processing.

In various implementations of stochastic cipher/decipher modules 84, an expected value module 86 may not be used directly during the encryption or decryption process, and the one or more alphanumeric characters corresponding with the one or more encrypted characters or the one or more encrypted characters may be generated using the expected value table 90 directly. In such implementations, the expected value table 90 may be generated prior to the encryption process using the expected value module 86 and all desired combinations of character parameters and position parameters.

The stochastic cipher/decipher module 84 may also be configured to receive one or more encrypted characters or one or more alphanumeric characters corresponding with one or more encrypted characters and to generate one or more mixed characters by utilizing a reverse stochastic cipher configured to use the expected value table 90 directly or the expected value module 86 configured to operate in reverse mode with the expected value table 90 to produce the corresponding character parameters and position parameters for each of the one or more encrypted characters or alphanumeric characters. With the character parameters and the position parameters, the stochastic cipher/decipher module 84 may be configured to utilize a mixed character generation module internal to the stochastic cipher/decipher module 84 that is configured to generate the one or more mixed characters by using the stochastic parameter table 88 to make the associations and send the resulting one or more mixed characters to the mixer cipher/decipher module 82.

The stochastic cipher/decipher module 84 may be coupled with a symbol selection/correlation module 92 configured to receive the one or more encrypted characters (whether alphanumeric or not) and utilize a symbol structure database 94 to either select one or more symbols at a position within the perimeter of a glyph corresponding with the one or more encrypted characters (during encryption) or to correlate one or more encrypted characters with one or more symbols at a position within the glyph (during decryption). The implementations of the one or more symbols, positions, and glyphs used may be like those implementations illustrated in FIGS. 1A and 1B and as otherwise described in this document. The symbol selection/correlation module 92 may be coupled with a glyph writing/reading module 96 that is in communication with a substrate 98. The glyph writing/reading module 96 may be configured to write to the surface of the substrate 98 the glyph generated by the symbol selection/correlation module and/or various copies of the generated glyph using any of a wide variety of systems and methods, such as, by non-limiting example, a laser system, an ink printing system, a lithographic system, an atomic transport/deposition system, or any other system and/or method capable of forming an image on a substrate. The glyph writing/reading module 96 may also be configured to read from the substrate 98 one or more glyphs by utilizing any of a wide variety of systems and methods, such as, by non-limiting example, optics and optical image processing methods, probes and molecular or atomic sensing methods, or any other system and/or method capable of detecting and processing an image on a substrate. The substrate 98 may be any of the substrates previously discussed.

In any of the implementations of glyph encryption systems and glyph encryption/decryption systems 78 disclosed in this document, the operations of the various modules may be carried out in a computer system, using software incorporated in a computer readable medium, or using a combination of a computer system and software incorporated in a computer readable medium. The symbol structure databases 94 and stochastic parameter tables 88 and expected value tables 90 may include data incorporated on computer readable media in any of a computer system, a server, a plurality of servers, a database, or a plurality of databases. Those of ordinary skill in the art will readily be able to select system components and database formats useful for implementations glyph encryption systems and glyph encryption/decryption systems 78 using the principles disclosed in this document.

In places where the description above refers to particular implementations of glyph encryption systems, it should be readily apparent that a number of modifications may be made without departing from the spirit thereof and that these implementations may be applied to other glyph encryption systems.

The invention claimed is:

1. A method of using glyphs to encrypt text, the method comprising:
   receiving text comprising one or more characters comprising an order;
   altering the order of the one or more characters using a mixer cipher to produce one or more mixed characters;
   substituting for the one or more mixed characters one or more encrypted characters using a stochastic cipher;
   generating at least one glyph by associating one or more symbols and a position of the one or more symbols within a perimeter of the at least one glyph with the one or more encrypted characters; and
   writing the at least one glyph to a substrate.

2. The method of claim 1, wherein the method further comprises:
   reading the at least one glyph from the substrate;
   generating the one or more encrypted characters by correlating the one or more symbols and the position of the one or more symbols within the perimeter of the at least one glyph with the one or more encrypted characters;
   substituting for the one or more encrypted characters one or more mixed characters using a reverse stochastic cipher; and
   forming the text comprising one or more characters by altering an order of the one or more mixed characters using a reverse mixer cipher.

3. The method of claim 1, wherein altering the order of the one or more characters using the mixer cipher further comprises sequentially exchanging the position of each of the one or more characters one or more times.

4. The method of claim 3, wherein substituting for the one or more mixed characters further comprises generating the one or more encrypted characters by:
   corresponding a character parameter and a position parameter with the one or more mixed characters using a stochastic parameter table; and
   associating the calculated value of the expected value function with one or more encrypted characters using an expected value table.

5. The method of claim 4, further comprising calculating a value of an expected value function using the character parameter and the position parameter.

6. The method of claim 5, wherein the expected value function is:

$$E[x^a(1-x)^b] = \sum_0^1 x^a(1-x)^b P(x)dx$$

where a is the character parameter, b is the text position parameter and $P(x)$ is a probability density function for x.

7. The method of claim 4, wherein generating at least one glyph by associating one or more symbols and the position of the one or more symbols within the perimeter of the at least one glyph further comprises:
   selecting the one or more symbols and the position of the one or more symbols using a symbol structure database; and
   wherein each of the one or more symbols and its position are uniquely correlated with an alphanumeric character through the symbol structure database; and
   wherein the perimeter of the at least one glyph comprises a cross.

8. A method of using glyphs to encrypt text, the method comprising:
   receiving text comprising one or more characters;
   altering an arrangement of the one or more characters using a mixer cipher to produce one or more mixed characters by sequentially translating a position of the one or more characters one or more times;
   generating one or more encrypted characters using a stochastic cipher by inputting a character parameter and a text position parameter corresponding with each of the one or more mixed characters into an expected value function;

associating an output of the expected value function with one or more alphanumeric characters corresponding with the one or more encrypted characters with an expected value table;

generating at least one glyph by associating one or more symbols and a position of the one or more symbols within a perimeter of the at least one glyph with the one or more encrypted characters using a symbol structure database; and writing the at least one glyph to a substrate.

9. The method of claim 8, wherein the method further comprises:

reading at least one glyph from the substrate;

generating the one or more encrypted characters by correlating the one or more symbols and the position of the one or more symbols within the perimeter of the at least one glyph with the one or more encrypted characters;

substituting for the one or more encrypted characters one or more mixed characters using a reverse stochastic cipher comprising a reverse expected value function configured to output the character parameter and the text position parameter corresponding with the one or more mixed characters using the one or more alphanumeric characters corresponding with the one or more encrypted characters and the expected value table;

generating the one or more mixed characters using a stochastic parameter table configured to correlate the output character parameter and the text position parameter with each of the corresponding one or more mixed characters; and forming the text comprising one or more characters by altering an arrangement of the one or more mixed characters using a reverse mixer cipher configured to reorder the one or more mixed characters by sequentially translating the position of the one or more mixed characters one or more times.

10. The method of claim 9, wherein generating one or more encrypted characters using the stochastic cipher further comprises selecting a probability density function for the expected value function.

11. The method of claim 10, wherein the expected value function is:

$$E[x^a(1-x)^b] = \sum_0^1 x^a(1-x)^b P(x) dx$$

where a is the character parameter, b is the text position parameter and P(x) is the probability density function for x.

12. The method of claim 9, wherein the symbol structure database further comprises where each of the one or more symbols and the position of the one or more symbols within the perimeter of the at least one glyph are uniquely correlated with an alphanumeric character through the symbol structure database and wherein the perimeter of the at least one glyph comprises a cross.

13. The method of claim 8, wherein associating an output of the expected value function with an alphanumeric character corresponding with the one or more encrypted characters further comprises:

corresponding a character parameter and a position parameter with the one or more mixed characters using a stochastic parameter table;

calculating a value of the expected value function using the character parameter and the position parameter; and associating the calculated value of the expected value function with one or more alphanumeric characters corresponding with one or more encrypted characters using the expected value table.

14. A system for using glyphs to encrypt text comprising:

a text input module configured to receive text comprising one or more characters;

a mixer cipher module coupled with the text input module and configured to alter an arrangement of the one or more characters using a mixer cipher to produce one or more mixed characters by sequentially translating a position of the one or more characters one or more times;

a stochastic cipher module coupled with the mixer cipher module and comprising an expected value module, the stochastic cipher module configured to generate one or more encrypted characters by sending a character parameter and a text position parameter corresponding with the one or more mixed characters to the expected value module, the expected value module configured to generate a value of an expected value function using the character parameter and the text position parameter and associate the value of the expected value function using an expected value table with one or more alphanumeric characters corresponding with the one or more encrypted characters;

a glyph generation module coupled with the stochastic cipher module and configured to generating at least one glyph by associating one or more symbols and a position of the one or more symbols within a perimeter of the at least one glyph with the one or more alphanumeric characters corresponding with the one or more encrypted characters using a symbol structure database; and a glyph writing module coupled with the glyph selection module and configured to write the at least one glyph to a substrate.

15. The system of claim 14, wherein the method further comprises:

a glyph reading module configured to read the at least one glyph from the substrate;

a glyph correlation module coupled with the glyph reading module and configured to generate the one or more encrypted characters by correlating the one or more symbols and the position of the one or more symbols within the perimeter of the at least one glyph with the one or more alphanumeric characters corresponding with the one or more encrypted characters using the symbol structure database;

a reverse stochastic cipher module coupled with the glyph correlation module and comprising a reverse expected value module, the reverse stochastic cipher module configured to substitute for the one or more encrypted characters one or more mixed characters using a reverse stochastic cipher by correlating the alphanumeric characters corresponding with the one or more encrypted characters with the character parameter and the text position parameter corresponding with the one or more mixed characters using the expected value table comprised in the reverse expected value module;

a mixed character generation module coupled with the reverse stochastic cipher module and configured to generate the one or more mixed characters using a stochastic parameter table configured to correlate the output character parameter and the text position parameter with the corresponding one or more mixed characters; and a text generation module coupled with the mixed character generation module and configured to form the text comprising one or more characters by altering an arrangement of the one or more mixed characters using a reverse mixer cipher configured to reorder the one or more mixed characters by sequentially translating the position of the one or more mixed characters one or more times.

16. The system of claim 14, wherein the symbol structure database further comprises where each of the one or more symbols and the position of the one or more symbols within the perimeter of the at least one glyph are uniquely correlated with an alphanumeric character through the symbol structure database and wherein the perimeter of the at least one glyph comprises a cross.

17. The system of claim 14, wherein the expected value function is:

$$E[x^a(1-x)^b] = \sum_0^1 x^a(1-x)^b P(x)dx$$

where a is the character parameter, b is the text position parameter and P(x) is a probability density function for x.

* * * * *